United States Patent [19]
Sharangpani et al.

[11] Patent Number: 5,860,017
[45] Date of Patent: Jan. 12, 1999

[54] PROCESSOR AND METHOD FOR SPECULATIVELY EXECUTING INSTRUCTIONS FROM MULTIPLE INSTRUCTION STREAMS INDICATED BY A BRANCH INSTRUCTION

[75] Inventors: Harshvardhan P. Sharangpani, Santa Clara; Gary N. Hammond, Campbell; Hans J. Mulder, San Francisco; Judge K. Arora, Cupertino, all of Calif.

[73] Assignee: Intel Corporation, Santa Clara, Calif.

[21] Appl. No.: 672,621

[22] Filed: Jun. 28, 1996

[51] Int. Cl.$^6$ ...................................... G06F 15/60
[52] U.S. Cl. ...................... 395/800.23; 395/583; 395/394
[58] Field of Search ................... 395/800.23, 800.24, 395/582, 581, 586, 587, 580, 394

[56] References Cited

U.S. PATENT DOCUMENTS 5,434,985 7/1995 Emma et al. .
5,634,103 5/1997 Dietz et al. .

OTHER PUBLICATIONS

Popescu, et al. "The Metaflow Architecture" IEEE. Jun. 1991 pp. 10–13; 63–73.
Johnson, et al. "Superscaler Microprocessor Design" Prentice Hall. 1991.
Gulati, et al. "Performance Study of a Multithreaded Superscalar Microprocessor" IEEE. Apr. 1996 pp. 291–301.
Pnevmatikatos et al. "Guard Execution & Branch Prediction in Dynamic ILP Processors", 1994.
Pnevmatikatos et al. "Control Flow Prediction for Dynamic ILP Processor", Mar. 1993.
Uht et al. "Disjoint Eager Execution: An Optimal Form of Speculative Execution", 1995.
Chang et al. The Importance of Prepass Code Scheduling for Superscalar and Superpipeline Processors, 1995.

*Primary Examiner*—Larry D. Donaghue
*Attorney, Agent, or Firm*—Cynthia Thomas Faatz

[57] ABSTRACT

A microprocessor for efficient processing of instructions in a program flow including a conditional program flow control instruction, such as a branch instruction. The conditional program flow control instruction targets a first code section to be processed if the condition is resolved to be met, and a second code section to be processed if the condition is resolved to be not met. A fetch unit fetches instructions to be processed and branch prediction logic coupled to the fetch unit predicts the resolution of the condition. The branch prediction logic of the invention also determines whether resolution of the condition is unlikely to be predicted accurately. Stream management logic responsive to the branch prediction logic directs speculative processing of instructions from both the first and second code sections prior to resolution of the condition if resolution of the condition is unlikely to be predicted accurately. Results of properly executed instructions are then committed to architectural state in program order. In this manner, the invention reduces the performance penalty related to mispredictions.

29 Claims, 6 Drawing Sheets

| ... | HISTORY 408 | STANDARD PREDICTION 410 | UNLIKELY TO BE PREDICTED ACCURATELY 412 |
|---|---|---|---|
| | 1101 | TAKEN | Y |
| ... | ⋮ | ⋮ | ⋮ |
| | | | |

BRANCH PREDICTION UNIT 336

| CODE SECTION 201 | INSTRUCTION 209 | OPERATION 211 |
|---|---|---|
| PARENT CODE SECTION 203 | 10 | ADD ... |
| | 11 | MOV ... |
| | 12 | IF A > B, THEN BRANCH TO INSTR 2000 |
| SEQUENTIAL CHILD CODE SECTION 205 | 13 | MUL ... |
| | 14 | ADD ... |
| | 15 | SUB ... |
| | 16 | IF B = C, THEN BRANCH TO INSTR 3500 |
| ⋮ | ⋮ | ⋮ |
| TARGET CHILD CODE SECTION 207 | 2000 | MOV ... |
| | 2001 | ADD ... |
| | 2002 | DIV ... |
| | 2003 | MOV |
| | ⋮ | ⋮ |

FIG. 2

| ... | HISTORY 408 | STANDARD PREDICTION 410 | UNLIKELY TO BE PREDICTED ACCURATELY 412 |
|---|---|---|---|
| | 1101 | TAKEN | Y |
| ... | ⋮ | ⋮ | ⋮ |
| | | | |

BRANCH PREDICTION UNIT 336

| IP NUMBER 502 | TAG 504 | OTHER FIELDS 506 | PRIORITY 516 |
|---|---|---|---|
| | | | |
| ⋮ | ⋮ | ⋮ | ⋮ |
| | | | |

STREAM TABLE 330

PROCESSOR AND METHOD FOR SPECULATIVELY EXECUTING INSTRUCTIONS FROM MULTIPLE INSTRUCTION STREAMS INDICATED BY A BRANCH INSTRUCTION

BACKGROUND OF THE INVENTION

1. Field of the Invention

The invention relates to the field of computer systems. Specifically, the invention relates to efficient processing of instruction streams which include conditional program flow control instructions, such as branch instructions.

2. Description of Related Art

Many microprocessors employ a technique known as hardware pipelining to increase instruction throughput by processing several instructions through different phases of execution concurrently. To maximize instruction execution efficiency, it is desirable to keep the instruction execution pipeline full (with an instruction being processed in each pipeline stage) as often as possible such that the pipeline produces useful output every clock cycle. However, whenever there has been a transfer of program flow control to another section of software code and instructions have been speculatively fetched and processed and it is determined that these instructions should not have been executed, the output from the pipeline is not useful.

Exceptions and program flow control instructions such as branch instructions, provide examples of how the program flow control can be changed. Branch instructions, which may be conditional or unconditional and may transfer program flow control to a preceding or subsequent code section, are used for frequently encountered situations where a change in program flow control is desired.

A conditional branch instruction determines instruction flow based on the resolution of a specified condition. "If A>B then branch to instruction X" is an example of a conditional branch instruction. In this case, if A>B, program flow control branches to a code section beginning with instruction X, also referred to as the target code section. If A is not greater than B, the instructions sequentially following the branch instruction in the program flow, referred to as the sequential code section, are to be executed.

Because pipelines in some microprocessors can be many stages deep, conditional branch instructions are often fetched before the condition specified in the branch instruction is resolved. In this case, the processor cannot reliably determine whether or not the branch will be taken, and thus, cannot decide from which code section to fetch subsequent instructions. In many processors, branch prediction logic operates to predict the outcome of a particular branch instruction based on a predetermined branch prediction approach. Instructions are then speculatively fetched from either the target code section or the sequential code section based on the prediction indicated by the branch prediction logic.

Although branch prediction accuracy may be improved or tuned by using different branch prediction algorithms, mispredictions still occur. By the time a misprediction is identified, many instructions from the incorrect code section may be in various stages of processing in the instruction execution pipeline. On encountering such a misprediction, instructions following the mispredicted conditional branch instruction in the pipeline (or multiple pipelines) are flushed, and instructions from the other, correct code section are fetched. Flushing the pipeline creates bubbles or gaps in the pipeline. Several clock cycles may be required be fore the next useful instruction completes execution, and before the instruction execution pipeline produces useful output. Because conditional branch instructions and other similar program flow control instructions are prevalent in software applications code (in some cases, they are encountered as frequently as one branch instruction for every five instructions processed), the cumulative microprocessor performance penalty caused by branch mispredictions can be significant, even where branch prediction accuracy is relatively high. Previous processors do not provide a means for identifying which branch instructions are unlikely to be predicted accurately such that mitigating measures may be taken.

Thus, it is desirable to have a means for reducing or eliminating the performance penalty related to mispredicting the outcome of program flow control operations to provide for more efficient instruction execution. Further, it is desirable to have a means for identifying program flow control instructions that are unlikely to be predicted accurately such that preventive measures may be selectively utilized for the particular instructions that are unlikely to be predicted accurately.

SUMMARY OF THE INVENTION

A microprocessor for efficient processing of instructions in a program flow including a conditional program flow control instruction, such as a branch instruction, is described. The branch instruction has a condition to be resolved and indicates a first code section to be processed if the condition is resolved to be met, and a second code section to be processed if the condition is resolved to be not met. The processor includes a fetch unit that fetches instructions, branch prediction logic coupled to the fetch unit that predicts the resolution of the condition and determines whether resolution of the condition is unlikely to be predicted accurately. The processor also includes stream management logic responsive to the branch prediction logic that directs speculative processing of instructions from both the first and second code sections prior to resolution of the condition if resolution of the condition is determined to be unlikely to be predicted accurately.

BRIEF DESCRIPTION OF THE DRAWINGS

The invention will be understood more fully from the detailed description given below and from the accompanying drawings of embodiments of the invention, which, however, should not be taken to limit the invention to the specific embodiments, but are for explanation and understanding only.

FIG. 2 is an illustration of instructions in a program flow as processed by one embodiment of the invention.

DETAILED DESCRIPTION OF THE INVENTION

Figure 1:
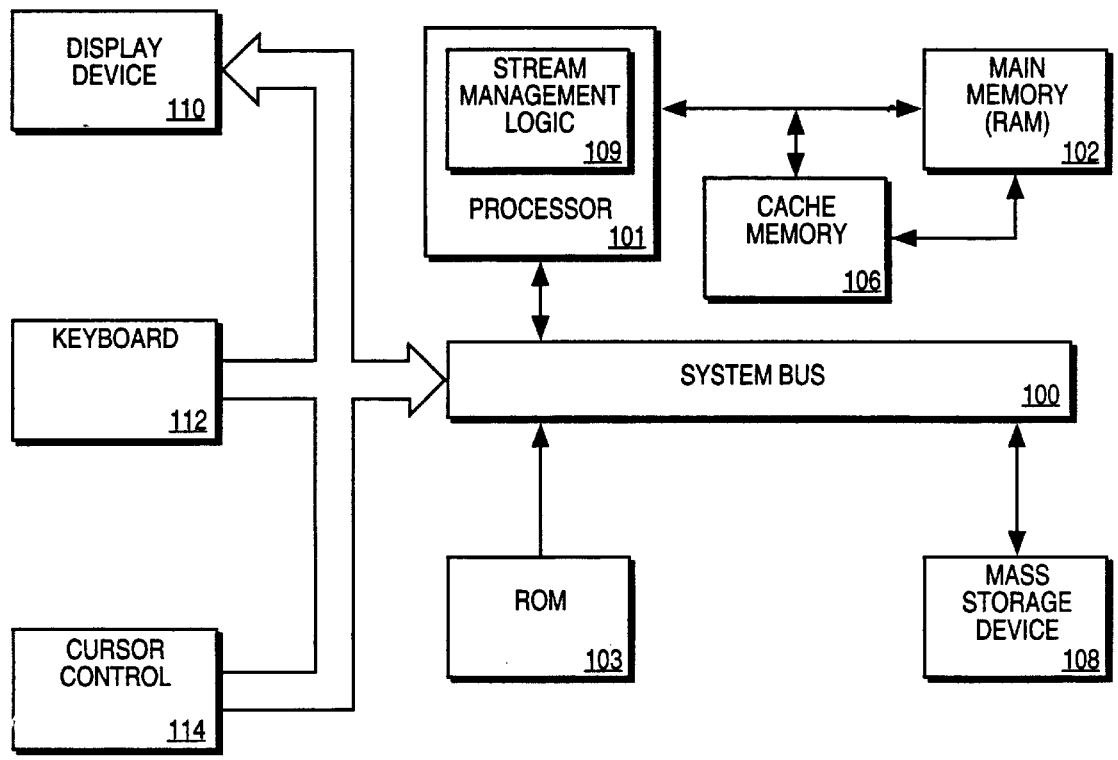
FIG. 1 is a high-level block diagram of the computer system in accordance with one embodiment of the invention.

A processor and method for efficient processing of instruction streams which include a conditional program flow control instruction are described. The operation of the invention is described herein with reference to conditional branch instructions for simplicity, although it is understood that other types of program flow control instructions are within the scope of the invention. Further, in the following description, numerous specific details are set forth, such as specific functional blocks, instruction formats, tables, etc., in order to provide a thorough understanding of the invention. However, it will be appreciated by one skilled in the art that the invention may be practiced without these specific details. In other instances, well-known structures, circuit blocks, and architectural functions have not been described in detail in order to avoid obscuring the invention.

Program Flow Control Instructions and Nomenclature

FIG. 2 illustrates, in tabular form, an example of several instructions in a program flow to clarify terminology used in the following description. The instructions in the program flow are divided into code sections. The term "code section" is used herein to refer to a block of code between two program flow control instructions, and which includes the second of the two program flow control instructions as its last instruction.

The code section including a particular program flow control instruction being evaluated at a particular time, is referred to herein as the parent code section. The code section 205 immediately following instruction 12 and the code section 207 beginning with instruction 2000 which is to be executed if the branch is resolved to be taken are referred to as child code sections. The labels "parent" and "child" depend on the relationship between the code section being evaluated and other code sections. Thus, the parent code section 203 may also be a child code section relative to one or more other code sections (not shown).

The code section 205 is referred to as the sequential child code section in relation to the code section 203, as it sequentially follows its parent code section 203. Similarly, the code section 207 is referred to as the target child code section in relation to the code section 203, as the first instruction of the code section 207 is the branch target instruction, instruction 2000, of the conditional branch instruction 12 in the parent code section 203.

An instruction stream as the term is used herein is a flow of instructions including one or more code sections. An instruction stream including the target child code section 207 is a target instruction stream, and an instruction stream including the sequential child code section 205 in relation to a particular branch instruction is a sequential instruction stream. As each conditional branch instruction is resolved, the microprocessor identifies the correct code section (or instruction stream including the code section) to be committed to architectural state. For example, if the branch is resolved to be taken, the results of execution from the target child code section are committed to the processor state.

It should also be noted that, while the two code sections indicated by a conditional program flow control instruction are identified as target and sequential code sections which are part of target and sequential instruction streams, it is possible that a conditional program flow control instruction will indicate two or more target code sections neither of which sequentially follows the program flow control instruction. It will be appreciated by those of skill in the art that although sequential code sections and sequential instruction streams are referenced below for exemplary purposes, each such reference is equally applicable to an alternate non-sequential target code section or instruction stream as well.

Overview of the Invention

The invention provides for efficient execution of instructions in a program flow including a branch instruction having a condition to be resolved. The processor of the invention includes means for predicting the resolution of the condition and thus, the conditional branch instruction. The processor of the invention also includes a means for identifying conditions, and thus, conditional branch instructions which are unlikely to be predicted accurately. In other words, the invention identifies branch instructions which, in relationship to other conditional branch instructions, have a relatively high likelihood of being mispredicted. In one embodiment, once a condition in a branch instruction is identified as being unlikely to be predicted accurately, if sufficient processor front-end resources are available, the processor of the invention fetches and decodes instructions from both the target and sequential (or second target) instruction streams indicated by the conditional branch instruction.

Then, if processor back-end resources are available, instructions from both the target and sequential instruction streams (which have been fetched and decoded) are forwarded to the processor back-end for processing. Execution resources of the processor back-end are shared between the multiple instruction streams providing for their concurrent execution. Once the condition of the conditional branch instruction is resolved, instructions from the incorrect stream are canceled while instructions from the correct instruction stream continue through any additional processing stages. Valid, executed instructions are subsequently retired and committed to architectural state. In this manner, the performance penalty incurred for branch mispredictions is significantly reduced if not eliminated.

In one embodiment, once instructions from both target and sequential child instruction streams indicated by a branch instruction have been fetched and decoded, if sufficient processor back-end resources are not available for concurrent processing of both instructions streams, the instructions from the instruction stream predicted to be taken are forwarded to the processor back-end for further processing. Instructions from the other instruction stream which have been fetched and decoded are placed in an instruction buffer for temporary storage. In this case, if resolution of the conditional branch instruction was mispredicted, only the back-end of the processor pipeline is flushed instead of the entire processor pipeline. Instructions from the correct instruction stream are then immediately available in the instruction buffer for continued processing in the processor back-end such that the performance penalty incurred for a misprediction is significantly reduced.

In an alternate embodiment, if a condition specified in a branch instruction is identified as being unlikely to be predicted accurately, availability of resources across the processor pipeline is evaluated only once (as differentiated from the embodiment described above where availability of sufficient processor front-end resources is assessed prior to forking and then availability of processor back-end resources is assessed once the instructions have been fetched and decoded). If sufficient processing resources are determined to be available, instructions from both the target and sequential instruction streams are fetched and processed until the branch instruction indicating the streams is resolved and the incorrect instruction stream is canceled.

Overview of the Computer System of the Invention

Referring to FIG. 1, a computer system in accordance with one embodiment of the invention is illustrated. The computer system of the invention includes a system bus 100 for communicating information, a processor 101 coupled to the bus 100 for processing information, a random access memory (RAM) 102, also referred to as system memory or main memory, coupled to the processor 101 for storing information and instructions for the processor 101, and a read only memory (ROM) 103 or other non-volatile storage device coupled to the bus 100 for storing fixed information and instructions for the processor 101. The computer system of the invention also includes an external cache memory 106 for storing frequently and/or recently used information for the processor 101. The cache memory 106 may be configured within the same integrated circuit device package as the processor 101, or in a separate device package. Other components such as a mass storage device 108, a display device 110 such as a printer or monitor, a keyboard 112 or other input device and a cursor control device 114 may also be included in the computer system of the invention.

In one embodiment of the invention, the processor 101 is an Intel Architecture microprocessor such as is manufactured by Intel Corporation of Santa Clara, California. Other processor architectures may also be used in accordance with the invention. Further, it is appreciated by those skilled in the art that other computer systems including additional components not illustrated in FIG. 1, or configured without components that are illustrated in FIG. 1 may also be used to practice the invention.

The Processor of One Embodiment of the Invention

Figure 3:
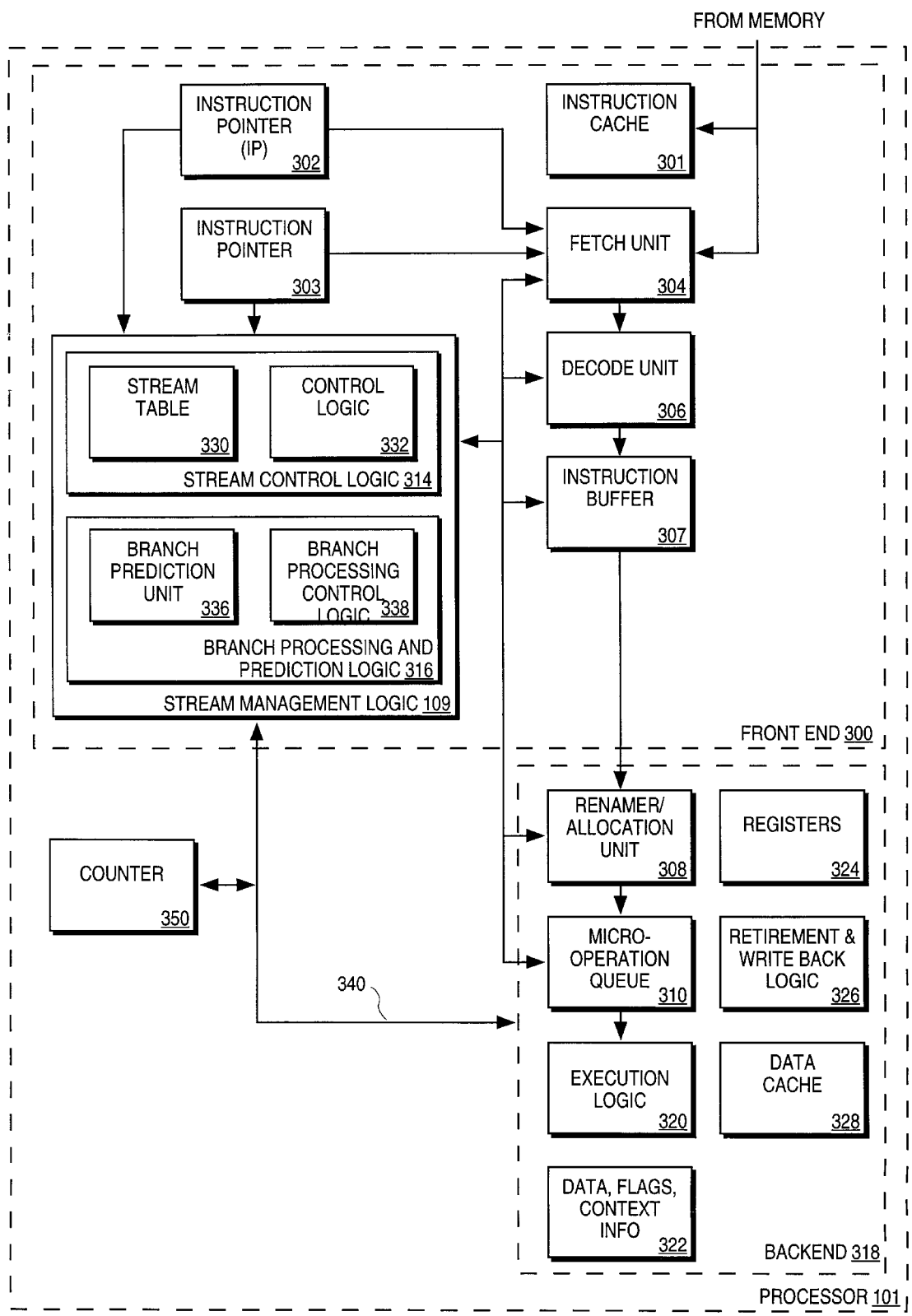
FIG. 3 is a block diagram of the processor organization of one embodiment of the invention.

FIG. 3 illustrates a block diagram of the processor 101 of one embodiment of the invention. The processor 101, includes an instruction pointer (IP) 302 for indicating the address of instructions currently being fetched. A second instruction pointer 303 is also included in one embodiment for managing a second stream of instructions as described in more detail below. A different number of instruction pointers is included in other embodiments to manage concurrent processing of a larger or smaller number of instruction streams.

Fetch unit 304 has inputs coupled to the instruction pointers 302 and 303 and operates to speculatively fetch instructions from an instruction cache memory 301, or from a next level of memory, such as the main memory 102 of FIG. 1 if the instructions are not available in the instruction cache memory 301. In one embodiment, the instruction cache memory 301 includes two read ports such that two fetch operations may be performed concurrently. Two virtual read ports may be provided by supporting two interleaved cache memory banks, each with one physical read port. In an alternate embodiment, the instruction cache memory 301 includes a multiplexed read port such that the cache memory can alternate between multiple read access request sources.

In one embodiment, a decode unit 306 is coupled to decode instructions received from the fetch unit 304 into operations which are more easily processed by the processor 101. One or more instruction buffers 307 are coupled to receive instructions which have been fetched and decoded. The instruction buffer 307 operates to temporarily store instructions from one or both of the target or sequential child instruction streams indicated by a conditional branch instruction as discussed in more detail below. Each of the above units along with stream management logic 109 is included in the processor front-end 300 in one embodiment. In alternate embodiments, the processor front- and back-ends may include different components or the processor may not be arranged in this manner.

The processor back-end 318 includes a renamer/allocation unit 308 in one embodiment which is coupled to the decode unit 306 and the instruction buffer 307. The renamer/allocation unit 308 operates to perform register renaming and allocation functions. This includes allocation of space in a re-order buffer (within retirement and write-back logic 326) for instruction retirement in embodiments providing for dynamic execution or out-of-order instruction processing. In alternate embodiments, the processor of the invention does not include a rename unit.

A micro-operation queue 310 is coupled to the renamer/allocation unit 308 in one embodiment, and operates to dispatch micro-operations to execution logic 320 which may contain ALUs, shifters, multipliers, and even data cache memories to execute load operations. Logic blocks, such as those discussed above, with the exception of the instruction buffer and the instruction cache memory 301 are considered to be part of the instruction execution pipeline, as they perform various operations in the instruction execution process. It should be noted that, in other embodiments, the processor of the invention may not include all of the above functional blocks. For example, the processor may not operate on micro-operations and thus, certain functional units related to micro-operations may not be included or may perform different functions.

The back-end 318 of one embodiment also includes logic blocks such as registers 324 for temporary information storage, a data cache memory 328, and the retirement and write back logic 326 for retiring instructions and committing the results of properly executed instructions to architectural state. The back-end 318 of one embodiment also includes additional registers or buffers 322 for storing data, flags and/or context information for the processor 101.

THE STREAM MANAGEMENT LOGIC OF ONE EMBODIMENT

The processor 101 of the invention also includes stream management logic 109 for managing processing of one or more instruction streams concurrently in the instruction pipeline of the processor 101. The stream management logic 109 of one embodiment includes branch processing and prediction logic 316 and stream control logic 314. The stream management logic 109 is coupled to logic blocks in the instruction pipeline of processor 101 such as the fetch 304, decode 306, and renamer 308 units. The stream management logic 109 is also coupled to the instruction pointer 302 and logic blocks in the back-end 318, such as the retirement and writeback logic 326 and the buffers 322.

The branch processing and prediction logic 316 of one embodiment of the invention includes a branch prediction unit 336 and branch processing control logic 338. The branch processing and prediction logic 316 of the invention performs a number of different functions including branch prediction, and branch history maintenance in some embodiments. The branch processing control logic 338 controls the execution of branch instructions and provides the control functions necessary for the operation of the branch prediction unit 336.

The Branch Prediction Unit of One Embodiment

Figure 4:
FIG. 4 illustrates features of the branch prediction unit of one embodiment of the invention in tabular form.

FIG. 4 illustrates the branch prediction unit 336 of one embodiment of the invention. Although specific fields and types of information are illustrated and described in reference to FIG. 4, it is appreciated by those of ordinary skill in the art that other fields including different types of information are also within the scope of the invention. Further, in the example illustrated in FIG. 4, several fields which may be included in the branch prediction unit 336 such as a tag field, and a valid field, for example, are well-known in the art and have not been shown in order to avoid obscuring the invention.

In the embodiment illustrated in FIG. 4, branch prediction unit entries are indexed according to an instruction address although other configurations are within the scope of the invention. The branch prediction unit 336 includes a prediction field 410 which indicates whether it is more likely that the branch indicated by the branch instruction being evaluated will be resolved to be taken, or will be resolved to be not taken. It is appreciated by those of ordinary skill in the art that any one or a combination of branch prediction approaches may be used in accordance with the invention to determine the prediction information to be stored in the branch prediction field 410.

The branch prediction unit 336 also includes a field 412 which indicates whether the resolution of the branch instruction referenced by the particular entry in the branch prediction unit is unlikely to be predicted accurately. A branch instruction which is identified as being unlikely to be predicted accurately is considered difficult to predict accurately, or more likely to be mispredicted than some other branch instructions as discussed in more detail below. It is appreciated by those of skill in the art that it is resolution of a condition associated with the branch instruction that is predicted and identified as being unlikely to be predicted accurately for branch instructions which are identified as being unlikely to be predicted accurately.

The information stored in the field 412 assists in branch processing by identifying conditional branch instructions which are worthwhile to fork to avoid a potential branch misprediction penalty. In other words, the invention determines, based in part on the information stored in the field 412, when it is an efficient use of microprocessor resources to execute instructions from both the target instruction stream and the sequential instruction stream.

Processing both instruction streams only if a conditional branch instruction is identified as being unlikely to be predicted accurately provides an important advantage. For example, in some cases, conditional program flow control instructions, such as branch instructions, may be encountered as frequently as one out of every five instructions. Assuming, for purposes of illustration, that a processor includes 10 pipeline stages with each stage containing four instructions on average, and that one of every five instructions is a conditional branch instruction. If the processor were to fetch and execute instructions from both the target and sequential instruction streams of every conditional branch instruction encountered, the processor 101 would need to provide resources to execute a very large number of streams concurrently considering the 40 stage pipeline. In this case, the instruction execution pipeline will become highly inefficient and will quickly run out of resources. To support concurrent processing of such a large number of instruction streams significant additional instruction processing resources would need to be added to the processor. By identifying the conditional branch instructions which are unlikely to be predicted accurately, and only forking to process both instruction streams indicated by the branch instruction if the branch instruction is so identified, the invention reduces or eliminates performance penalties which may be incurred by branch mispredictions without significantly increasing the hardware resources required for efficient processing.

The determination of whether a branch instruction is unlikely to be predicted accurately, and thus, the determination of the information to be stored in the field 412, may be based on many different factors and may be determined using a number of different approaches. In some embodiments, the information considered to determine whether a branch instruction is unlikely to be predicted accurately, is the same as, or similar to the information used to determine the predicted resolution of the branch instruction. For example, in one embodiment, conditional branch instructions are identified as being unlikely to be predicted accurately if the particular branch instruction has not been encountered before. In this case, the branch instruction is identified as being unlikely to be predicted accurately based on the fact that there is no entry in the branch prediction unit 336 for this instruction.

A branch instruction may be considered to be unlikely to be predicted accurately based on information stored in a branch history field such as the field 408. Information stored in the branch history field of one embodiment indicates how many times the resolution of the branch instruction was mispredicted and/or how the branch instruction was resolved out of the last number of times the branch instruction was encountered. The branch history field 408 may include only one bit providing information regarding the last time the branch instruction was fetched, or several bits of information providing information for many previous encounters with the particular branch instruction. Information regarding the resolution of each branch instruction is communicated from the back-end 318 to the branch processing and prediction logic 316 over a bus 340 (shown in FIG. 3) in order to update the branch history each time a branch or other program flow control instruction is resolved.

Using the branch history field 408, in one embodiment, all conditional branch instructions which were mispredicted the last time they were encountered are identified as being unlikely to be predicted accurately. In embodiments in which a more detailed branch history is kept, a branch instruction may be identified as being unlikely to be predicted accurately if the branch instruction was mispredicted x out of the last y times it was executed, or, in other words, the misprediction rate is higher than a predetermined percentage.

The processor 101 may also use additional information in determining that a particular conditional branch instruction, or type of conditional branch instruction, is unlikely to be predicted accurately. In one embodiment, additional flags and context information are stored in the branch prediction unit 336 in other fields (not shown) to provide more information about the branch instruction and surrounding instructions on which to base such a determination. For example, in one embodiment, all branch instructions associated with a server application may be considered to be unlikely to be predicted accurately based on their context.

In another embodiment, the invention includes a counter 350 coupled to the stream management logic 109 which counts a number of microprocessor clock cycles since the particular branch instruction was last mispredicted. If the number of clock cycles since the particular branch instruction was last mispredicted is above a certain number, the branch instruction is identified as being unlikely to be predicted accurately.

Each of the above approaches may be used alone or in combination with another approach to identify a particular branch instruction as being unlikely to be predicted accurately. The criteria used to identify a branch instruction that is unlikely to be predicted accurately may be selected based on the most commonly used software for a particular computer system, characteristics common to software in general, or can be directed toward a specific set of software programs for which the processor is targeted. In this manner, the invention provides the flexibility to meet general or specific performance improvement requirements.

While the branch prediction unit 336 of the invention is illustrated as one table including multiple fields, it is appreciated by those of ordinary skill in the art that the branch prediction unit 336 may include multiple buffers or other logic providing for storage and processing of similar information.

The Stream Control Logic of One Embodiment

Referring back to FIG. 3, when a conditional branch instruction is fetched, if the branch prediction unit 336 indicates that the conditional branch instruction is unlikely to be predicted accurately, or information regarding the branch instruction is not available in the branch prediction unit 336, the fetch unit 304 of the processor 101 speculatively fetches instructions from both the target and sequential child code sections if sufficient additional processor front-end resources are available for front-end processing of both instruction streams. The stream control logic 314 of the invention controls the processing of the multiple instruction streams including the target and sequential child code sections, until the condition within the branch instruction is resolved, and the correct instruction stream including the correct code section(s) is identified. The stream control logic 314 operates to keep instructions flowing through the instruction processing pipeline of the processor 101, without requiring a significant increase in instruction processing resources to provide for the concurrent processing of multiple instruction streams.

In one embodiment, the stream control logic 314 includes one or more stream tables 330. The stream table 330 operates to keep track of the multiple instruction pointers used to control processing of multiple instruction streams in the processor pipeline. A predetermined number of instruction pointers is available to be associated with instruction streams being processed in the instruction execution pipeline. In the embodiment illustrated in FIG. 3, two instruction pointers are included although additional instruction pointers may be provided such that more than two instruction streams may be processed concurrently. The number of instruction pointers available is one factor in determining the maximum number of instruction streams which can be "alive," or in process within the instruction processing pipeline at one time in one embodiment. Thus, the number of instruction pointers available to be associated with instruction streams can be selected by the processor designer to meet performance and hardware resource requirements of a specific computer system in accordance with the invention.

In one embodiment, a new instruction stream is spawned each time a conditional branch instruction is fetched and identified as being unlikely to be predicted accurately (assuming resources are available as discussed in more detail below). In one embodiment, the newly spawned instruction stream includes the code section (either the target child code section or the sequential child code section) which is predicted not to be executed. The code section which is predicted to be executed is part of the instruction stream which includes the parent code section, and is already associated with an instruction pointer to track its processing in the pipeline.

The stream table 330 of one embodiment, is described in more detail with reference to FIG. 5. The information in the field 502 indicates the instruction pointer (IP) number or otherwise identifies the particular instruction pointer referenced in that particular entry of the stream table 330. In alternate embodiments, the stream table 330 does not include a field 502 for the IP number, and the IP number is determined instead by its location in the stream table 330.

The stream table 330 also includes a field 504 for storing a tag which uniquely identifies the instruction stream associated with a particular instruction pointer such that the instruction stream can be properly managed in the instruction execution pipeline. In a simple case in which two instruction streams are being processed in the processor pipeline concurrently, the tag field 504 stores a simple tag identifying one instruction stream associated with a first instruction pointer as the sequential instruction stream indicated by the branch instruction and the other instruction stream associated with a second instruction pointer as the target instruction stream indicated by the branch instruction. Then, when the branch instruction is resolved, the information in the tag field 504 identifies which instruction stream will continue processing and which will be canceled.

In embodiments providing for concurrent execution of a larger number of instruction streams, the tag 504 may include several sub-fields providing additional information for each instruction stream. This additional information may include for example an address identifying the parent branch instruction, whether the instruction stream associated with the particular instruction pointer has spawned any child instruction streams, and possibly the instruction pointers associated with any child instruction streams such that concurrent execution of multiple instruction streams may be properly managed.

The stream table 330 may also include other fields 506 such as a field indicating whether the entry is valid and/or a field indicating whether the instruction pointer is still alive or whether the instruction stream associated with the instruction pointer has been canceled. In this manner, the stream table 330 is used during the instruction retirement process in one embodiment to identify the instructions to be committed to processor state.

A priority field 516 is also included in one embodiment and is discussed in more detail below in the section regarding management of processor resources.

The stream control logic 314 also includes control logic 332 in one embodiment. Control logic 332 performs many functions including managing storage of information in the stream table 330, invalidating entries in the stream table 330 when program flow control instructions are resolved, determining stream control logic and processor resource availability, and directing the use of hardware resources to provide for concurrent processing of multiple instruction streams as discussed below.

If the program flow control instruction of the code section is a conditional branch instruction which is unresolved, the branch prediction unit 336 helps in determining the next instructions to be fetched. If the particular branch instruction is identified as being unlikely to be predicted accurately as discussed above, and sufficient processor resources are available, instructions from both the target and sequential child code sections will be fetched and at least partially processed until the branch instruction is resolved.

In one embodiment, sufficient additional front-end processor resources are available for concurrent processing of instruction streams including both the sequential and target child code sections if one additional IP is available as indicated by information stored in the stream table 330. In one embodiment, the control logic 332 determines the availability of IPs in the stream table 330. In one embodiment, this is the only point at which an assessment of availability of processor resources that is made. Once it is determined that sufficient processor resources are available, concurrent processing of the target and sequential instruction streams proceeds through the processor pipeline until the conditional branch instruction is resolved.

In another embodiment, a second assessment of the availability of processor resources is made by the control logic 332 once multiple instruction streams have been spawned, and instructions from both streams are in the process of being fetched and decoded. Processor back-end resource availability is determined and instructions from both target and sequential instruction streams are forwarded to the back-end only if sufficient additional processor resources are available for concurrent execution of both instruction streams. One method of determining whether sufficient back-end resources are available is by counting the number of outstanding memory accesses already issued, or counting the number of entries allocated into various execution and retirement buffers. If sufficient back-end resources are not available, only the instruction stream predicted to be executed is forwarded to the back-end for further processing and the other instruction stream is temporarily stored in the instruction buffer 307 of FIG. 3 and thus, available for immediate processing if a misprediction is later identified.

Figure 5:
FIG. 5 illustrates the stream tables of one embodiment of the invention.

Referring back to the stream table 330 of FIG. 5, if forking is indicated (the branch instruction being evaluated is unlikely to be predicted accurately and adequate resources are available), the stream table 330 is updated for the new IP entry as discussed above with an appropriate tag for the new instruction stream.

The stream table 330 may also be updated with the appropriate tag if instructions are fetched from only the code section predicted to be processed. Instructions are fetched only from the code section predicted to be processed if a branch instruction is not identified as being unlikely to be predicted accurately or if adequate resources are not available as discussed above.

In one embodiment, if instructions from both the target and sequential child code sections indicated by a particular branch instruction are speculatively fetched and speculatively processed as discussed above, processing of both code sections continues until the condition indicated by the branch instruction is resolved. Processing of speculatively fetched instructions from both the target and sequential child code sections or instruction streams may proceed through all aspects of instruction processing, including execution, and up to, but not including retirement.

In one embodiment, once the branch instruction is resolved, processing of instructions from the "incorrect" code section is aborted without regard to the processing stage of the instructions, and the entries in the stream table 330 corresponding to these code sections are invalidated by the control logic 332. In other embodiments, the instructions from both the target and sequential child code sections are processed through all processing stages prior to retirement, and then only instructions from the "correct" instruction stream including the correct code section are retired and committed to architectural state. The IP associated with the incorrect instruction stream is then freed up for use by another code section. The IP may be freed up by indicating that the entry is invalid, for example. Also in one embodiment, once the conditional branch instruction is resolved, the incorrect instruction stream is identified as not being live any longer and no additional instructions from that particular instruction stream are fetched.

Once instruction execution is completed, instructions in the program flow are retired in program order. Results produced by speculatively executed instructions from a code section identified as being an "incorrect" code section, and thus, invalid, are not committed to the processor state. In this manner, the speculatively executed instructions from the incorrect code section do not affect the architectural state of the processor.

By executing instructions from instruction streams including both the target and sequential child code sections for conditional branch instructions identified as being unlikely to be predicted accurately, the invention reduces or eliminates the performance penalty associated with branch mispredictions. In accordance with the invention, once the conditional branch instruction is resolved and the correct code section is identified, further processing of the incorrect code section is aborted. Instructions from the correct code section are already in process in the pipeline and instructions from the incorrect code section which are in process in the pipeline are invalidated. In this manner, the delay caused by flushing the pipeline upon identifying a misprediction is avoided for conditional branch instructions identified as being unlikely to be predicted accurately.

Management of Instruction Processing Resources

The instruction processing resources of the instruction execution pipeline of the processor 101 are managed, as discussed above, to provide for the concurrent execution of multiple instruction streams without requiring a proportional increase in instruction processing hardware resources. In one embodiment of the invention, the processor instruction execution resources are not increased beyond the resources required to execute a single instruction stream along predicted paths of branch instructions. In other embodiments, particular stages of the instruction execution pipeline are duplicated, or hardware resources in a particular unit are increased to provide additional performance enhancements. For example, the execution logic 320 of one embodiment includes a sea of execution units such that several instructions may be processed through the instruction execution phase of the pipeline concurrently. The determination of hardware resource requirements in one embodiment, is based on space, cost, and performance trade-offs.

In one embodiment, processing of multiple streams is time multiplexed such that the instruction processing resources can be effectively shared. Hardware resources are thus, alternately dedicated to the various instruction streams in process in the instruction processing pipeline such that the instruction streams proceed through the pipeline stages in parallel. Time-multiplexing of the hardware instruction processing resources is managed by the control logic 332 in one embodiment. Any number of approaches may be used to implement time-multiplexing in accordance with the present invention.

In another embodiment, the stream table 330 includes an additional field 516 for storing information indicating a relative priority of a particular live code section in relation to other code sections being processed in the instruction execution pipeline. In one embodiment, where instructions are fetched from both the target and sequential child code sections indicated by a particular conditional branch instruction, the child code section predicted to be executed by the branch prediction logic 336, is identified as having a higher priority than the other child code section. For example, if the branch prediction unit 336 predicts that the branch being evaluated will be taken (even though the branch prediction unit 336 also indicates that resolution of the branch instruction is unlikely to be predicted accurately), the target child code section is identified as having a higher priority than the sequential child code section. In this manner, more of the instruction processing resources in the instruction execution pipeline may be directed to the higher priority instruction stream including the higher priority code section.

In an alternate embodiment, the priority indicator associated with a particular code section is monitored by the control logic 332 during processing. Additional information available during processing of the program may be used in some embodiments to dynamically adjust the priority assigned to a particular code section to respond to changing events. For example, a condition affecting the predicted resolution of an unresolved conditional branch instruction may cause the control logic 332 to switch the relative priority of a target child code section with that of a sequential child code section.

It will be appreciated by those of ordinary skill in the art that other approaches for sharing instruction processing resources are also within the scope of the invention. Thus, the invention provides for efficient processing of instructions in a program flow including conditional program flow control instructions. By identifying conditional branch or other program flow control instructions that are unlikely to be predicted accurately, and executing down both the sequential and target instruction streams, the invention reduces or eliminates the performance penalty due to branch mispredictions. Further, the invention manages concurrent execution of multiple streams to reliably maintain the processor state, and to provide for efficient processing of multiple instructions streams concurrently without a significant increase in hardware resources. The invention thus provides for significant instruction processing performance increases.

One Embodiment of the Method of the Invention

Figure 6A:
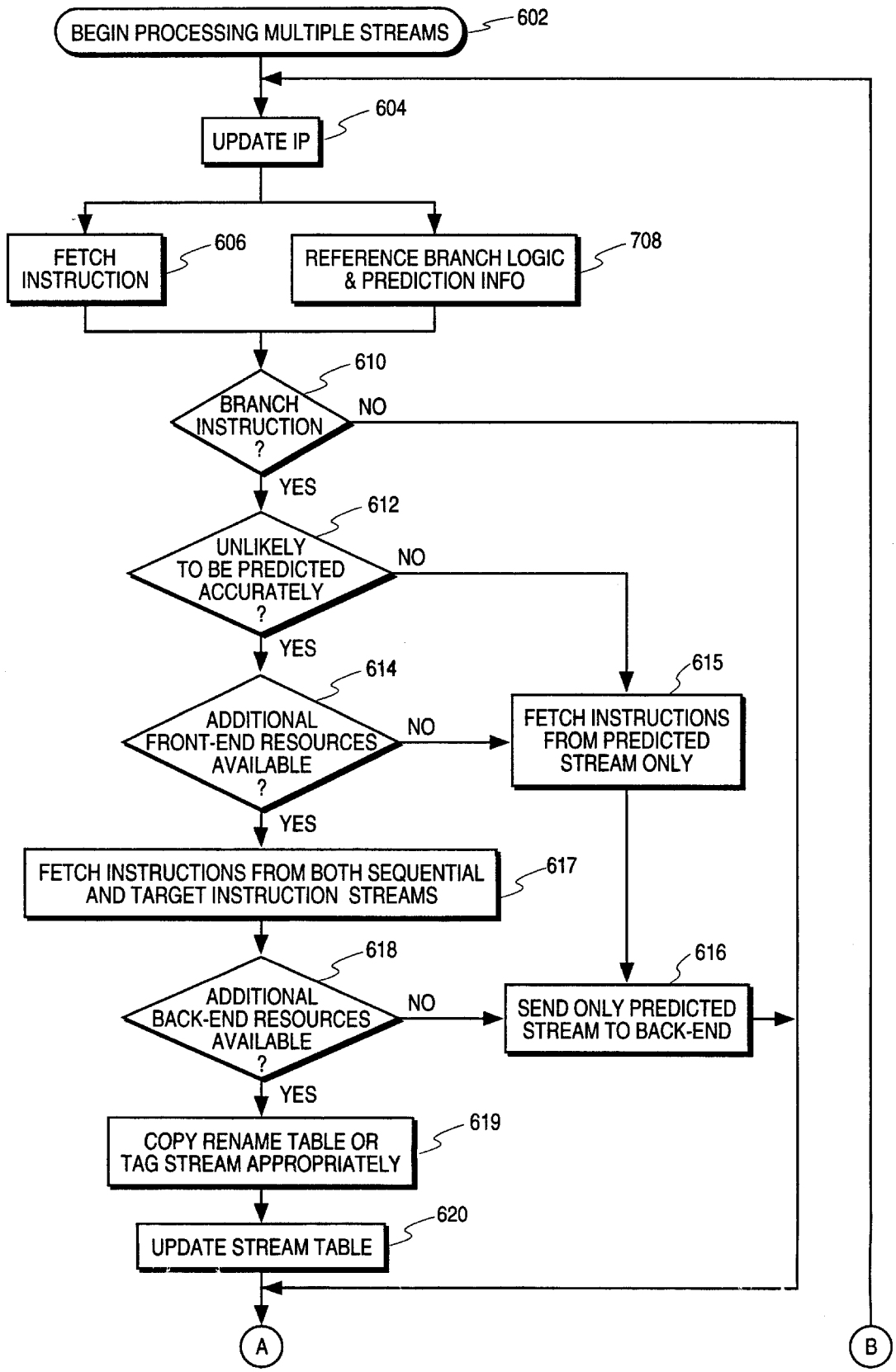
FIGS. 6A and 6B illustrate the method of one embodiment of the invention.
Figure 6B:
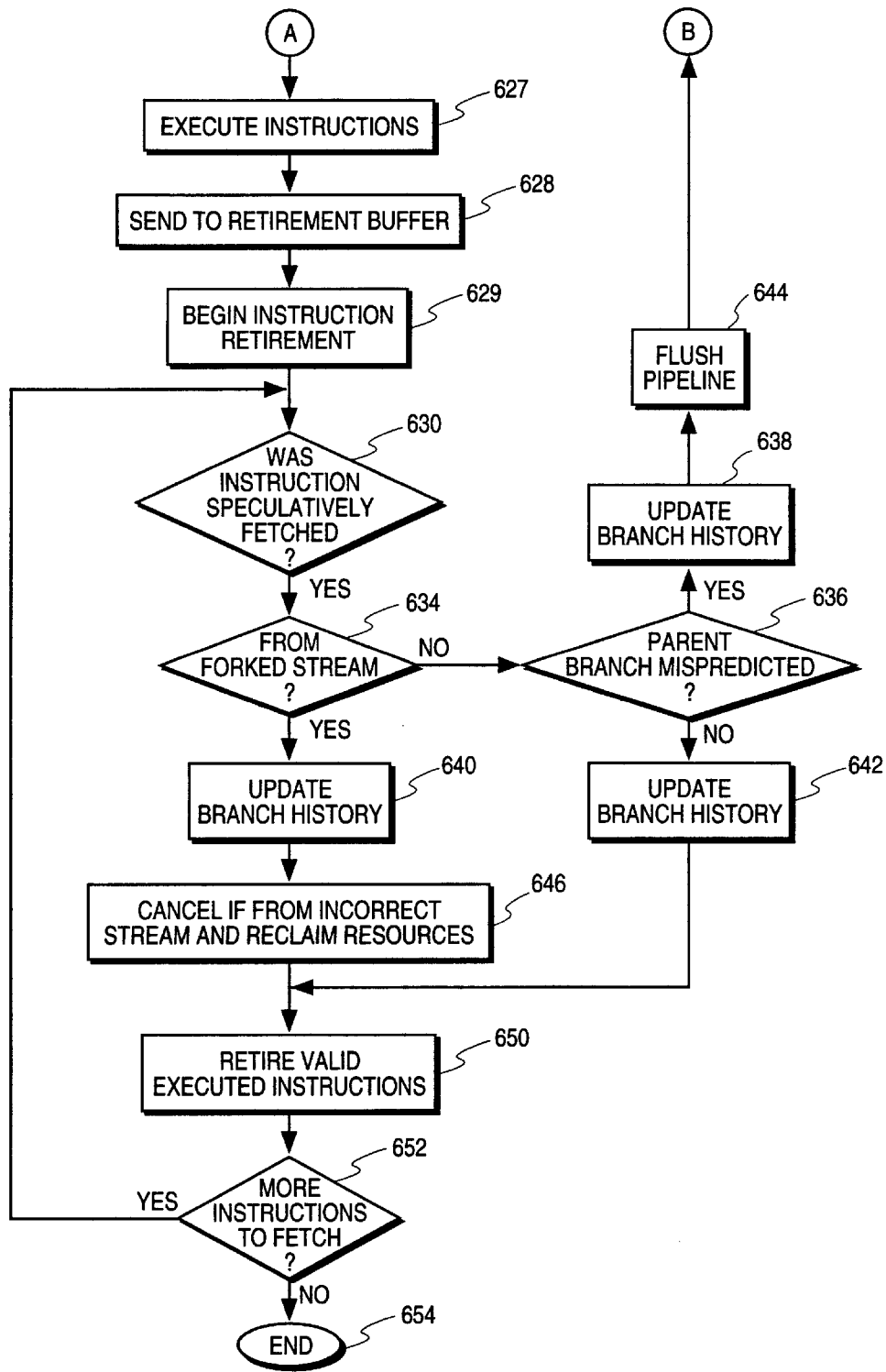

The operation of the invention is further clarified with reference to FIGS. 6A and B which illustrate the method of one embodiment of the invention beginning in processing block 602. At step 604, an instruction pointer (IP) is updated, and at steps 606 and 608, which may be performed in parallel in some embodiments, the instruction or instructions indicated by the IP are fetched, and the branch prediction table is referenced for branch prediction information where appropriate. At this point, if the instruction is a branch instruction, and the branch prediction table includes an entry for the branch instruction, it will indicate whether the branch is predicted to be taken or not taken. At step 610, it is determined whether the fetched instruction(s) is a branch instruction. This determination may be the result of the instruction decoder or it could be a guess by the machine based on the address of the instruction. If it is not a branch instruction, the instruction is executed at step 627, and is processed through the remainder of the instruction processing pipeline.

If the instruction is a branch instruction, then at step 612, it is determined whether the branch instruction is unlikely to be predicted accurately. Step 612 may alternately be completed at the time that the branch prediction logic is referenced at step 608. If the branch instruction does not have a high likelihood of being mispredicted as indicated by the branch prediction logic, then at step 615, instructions are fetched from the code section predicted by the branch prediction logic to be executed, processed by the processor front-end and forwarded to the processor back-end for further processing in step 616. Processing of the instructions then continues at step 627.

If the branch instruction is identified as being unlikely to be predicted accurately, at step 612, then at step 614 in one embodiment, it is determined whether adequate additional processor front-end resources are available to process instructions from both the target and sequential child code sections. If adequate processor front-end resources are not available, then in step 615, instructions are fetched from the predicted stream only, the fetched instructions are processed by the processor front-end and in step 616, are forwarded to the processor back-end. Processing continues at step 627.

Referring back to decision block 614, if adequate processor front-end resources are available, then in step 617, instructions are fetched from both the target and sequential instruction streams which are both then processed by the processor front-end. In one embodiment, this processing includes decoding the instructions and temporarily storing one or both of the instruction streams in an instruction buffer as described above.

At decision block 618, the availability of additional processor back-end resources is determined. If adequate additional processor back-end resources are not available to process both target and sequential child instruction streams, then in step 616, only the instruction stream predicted to be executed is forwarded to the processor back-end and processing continues at step 627. Referring back to decision block 618, if adequate processor back-end resources are available to process both the target and sequential child instruction streams, then both streams are forwarded to the back-end either directly or from the instruction buffer and processing continues in step 619. In one embodiment, adequate resources are available if one instruction pointer is available and two section names are available as indicated by the stream table.

In an alternate embodiment, when a branch instruction is encountered, overall processor resources are evaluated to determine whether to fork to fetch down both the target and sequential child instruction streams. In this embodiment, processing of both instruction streams continues until the branch instruction spawning the child instruction streams is resolved. In this manner, evaluation of processor resources is not divided into evaluation of processor front-end resources and evaluation of processor back-end resources.

At step 619, the rename table is copied, or in embodiments which do not rename registers, the instruction stream is tagged appropriately. At step 620, the stream table is updated to associate a free instruction pointer with the newly spawned instruction stream and/or other fields are updated as needed.

At step 627, instructions are executed including speculatively fetched instructions which are part of a forked instruction stream for which the parent branch instruction has not been resolved. Instructions which have been executed are sent to the retirement buffer in step 628 and the instruction retirement process begins at step 629.

The steps following step 629 are performed for each instruction to be retired in parallel. At step 630, it is determined whether the instruction(s) is a speculatively fetched instruction. If not, then processing continues at step 650 where valid executed instructions are retired. At decision block 652, if there are more instructions to be retired, processing continues back at processing step 630. Otherwise, the method ends at step 654.

Referring back to decision block 630, if the instruction(s) is a speculatively fetched instruction, then at decision block 634, it is determined whether the instruction is from an instruction stream that was forked (because the parent branch instruction was identified as being unlikely to be predicted accurately). If not, then at decision block 636, it is determined whether the processor mispredicted resolution of the parent branch instruction. If not, at step 642, the branch history is updated and processing continues at step 650. Referring back to decision block 636, if resolution of the parent branch instruction was mispredicted, in step 638, the branch history is updated to reflect the resolution of the parent branch instruction and in step 644, the pipeline or portion of the pipeline is flushed as discussed above. Processing then continues at step 652.

Referring back to decision block 634, if the instruction is part of a child instruction stream spawned by a parent branch instruction that was forked, then in step 640, the branch history is updated. In step 646, the instruction is canceled if it is from the incorrect stream and resources dedicated to the canceled instruction are reclaimed. In step 650, validly executed instructions are retired in program order and committed to architectural state. At decision block 652, it is determined whether there are more instructions to retire and if not, the method of one embodiment of the invention ends at step 654.

It is understood by those of ordinary skill in the art that in a pipelined processor, instructions will be at various stages of execution concurrently. Thus, various steps of the method of the invention are also performed concurrently and continuously.

Thus, a processor and method for efficient execution of instructions in a program flow is described. Whereas many alterations and modifications of the invention will be appreciated by one of ordinary skill in the art after having read the foregoing description, it is understood that the particular embodiments shown and described by way of illustration are in no way intended to be considered limiting. Therefore, references to details of the individual embodiments are not intended to limit the scope of the claims which in themselves, recite only those features regarded as essential to the invention.

We claim:

1. A microprocessor for processing instructions including a branch instruction having a condition to be resolved, a first code section to be processed if the condition is resolved to be met, and a second code section to be processed if the condition is resolved to be not met, the microprocessor comprising:

a fetch unit for fetching instructions from a memory;

branch prediction logic coupled to the fetch unit that predicts the resolution of the condition and determines whether the resolution of the condition is unlikely to be predicted accurately; and stream management logic responsive to the branch prediction logic that directs speculative processing of instructions from both the first and second code sections prior to resolution of the condition if the resolution of the condition is determined to be unlikely to be predicted accurately.

2. The microprocessor as set forth in claim 1 wherein, if the branch prediction logic determines that the resolution of the condition is not unlikely to be predicted accurately, the stream management logic directs speculative processing of the first code section if the prediction logic predicts that the condition will be resolved to be met, and the second code section if the prediction logic predicts that the condition will be resolved to be not met.

3. The microprocessor as set forth in claim 1 wherein the branch prediction logic includes a buffer that indicates a predicted resolution of a condition for each of a plurality of branch instructions and an address of each branch instruction for which a predicted resolution is indicated, and wherein the branch prediction logic determines that resolution of the condition is unlikely to be predicted accurately if the address of the branch instruction is not indicated in the buffer at a time that the branch instruction is fetched.

4. The microprocessor as set forth in claim 1 wherein the branch prediction logic further indicates whether resolution of the condition was mispredicted a last time the branch instruction was fetched, and wherein the branch prediction logic determines that resolution of the condition is unlikely to be predicted accurately when resolution of the condition was mispredicted the last time the branch instruction was fetched.

5. The microprocessor as set forth in claim 1 wherein the branch prediction logic further indicates a number of times the resolution of the condition has been mispredicted out of a number of times the branch instruction has been fetched, and wherein the branch prediction logic determines that resolution of the condition is unlikely to be predicted accurately if the resolution of the condition has been mispredicted a predetermined percentage of the number of times the branch instruction has been fetched.

6. The microprocessor as set forth in claim 1 wherein the branch instruction is in a program and the branch prediction logic determines whether the resolution of the condition is unlikely to be predicted accurately based on a context of the branch instruction in the program.

7. The microprocessor as set forth in claim 1 further including a counter coupled to the stream management logic that counts a number of clock cycles since the branch prediction logic last mispredicted the resolution of a condition, and wherein the branch prediction logic determines that the resolution of the condition is unlikely to be predicted accurately if the counter is greater than a first predetermined number.

8. The microprocessor as set forth in claim 1 wherein the stream management logic tracks concurrent processing of a plurality of instruction streams up to a first predetermined maximum number of instruction streams, each instruction stream including a plurality of code sections.

9. The microprocessor as set forth in claim 8 wherein the stream management logic is further responsive to availability of processor resources, the stream management logic directing speculative processing of instructions from both the first and second code sections prior to resolution of the condition if a number of instruction streams being concurrently processed is one less than the first predetermined maximum number.

10. The microprocessor as set forth in claim 1 wherein the stream management logic indicates a priority for speculative processing of each of the first and second code sections, the priority of the first code section being higher than the priority of the second code section if the branch prediction logic predicts that the condition will be resolved to be met, the priority of the first code section being lower than the priority of the second code section if the branch prediction logic predicts that the condition will be resolved to be not met.

11. In a microprocessor, a method for processing instructions in a program including a branch instruction having a condition to be resolved, a first code section to be processed if the condition is resolved to be met, and a second code section to be processed if the condition is resolved to be not met, the method comprising the steps of:

fetching the branch instruction;

predicting whether the condition will be resolved to be met;

determining whether the resolution of the condition is unlikely to be predicted accurately; and forking the program flow to speculatively process instructions from both the first and second code sections if the resolution of the condition is determined to be unlikely to be predicted accurately.

12. The method as set forth in claim 1 1 further including the following steps if the resolution of the condition is determined not to be unlikely to be predicted accurately:

speculatively processing the first code section if the condition is predicted to be resolved to be met; and speculatively processing the second code section if the condition is predicted to be resolved to be not met.

13. The method as set forth in claim 11 wherein the resolution of the condition is determined to be unlikely to be predicted accurately if the branch instruction has not been fetched before.

14. The method as set forth in claim 11 further including a step of storing information indicating whether the branch instruction was mispredicted a last time the branch instruction was fetched and wherein the resolution of the condition is unlikely to be predicted accurately if the resolution of the condition was mispredicted when a last time the branch instruction was fetched.

15. The method as set forth in claim 11 further including a step of storing a misprediction percentage indicating a number of times the resolution of the condition has been mispredicted out of a number of times the branch instruction has been fetched, and wherein the resolution of the condition is determined to be unlikely to be predicted accurately when the misprediction percentage is higher than a predetermined percentage.

16. The method as set forth in claim 12 wherein the steps of forking and speculatively processing are controlled by stream management logic, the stream management logic controlling concurrent processing of a first predetermined maximum number of instruction streams.

17. The method as set forth in claim 16 further including a step of assigning a first instruction pointer of a second predetermined maximum number of instruction pointers to a first instruction stream including the first code section and second instruction pointer to a second instruction stream including the second code section, each of the instruction pointers indicating an address of an instruction being processed in the corresponding instruction stream.

18. The method as set forth in claim 18 further including the following steps:
resolving the condition;
aborting processing of the second code section if the condition is resolved to be met;
aborting processing of the first code section if the condition is resolved to be not met;
invalidating the instruction pointer associated with the aborted code section;
completing processing of instructions in non-aborted code sections; and
committing results of instructions in non-aborted code sections to architectural state.

19. The method as set forth in claim 18 further including, prior to the forking step, a step of determining whether sufficient processor resources are available for forking, sufficient processor resources being available if one instruction pointer is available and wherein the step of forking is performed if the conditional branch instruction is unlikely to be predicted accurately and sufficient processor resources are available.

20. The method as set forth in claim 19 further including the following steps if sufficient processor resources are determined not to be available:
speculatively processing the first code section if the condition is predicted to be resolved to be met; and
speculatively processing the second code section if the condition is predicted to be resolved to be not met.

21. A computer system comprising:
a memory that stores instructions in a program flow, the program flow including a branch instruction having a condition to be resolved, a first code section to be processed if the condition is resolved to be met and a second code section to be processed if the condition is resolved to be not met;
a bus coupled to the memory that communicates information; and
a microprocessor including:
a fetch unit that fetches instructions in the program flow from the memory,
branch prediction logic coupled to the fetch unit that predicts the resolution of the condition and that determines whether the resolution of the condition is unlikely to be predicted accurately, and
stream management logic responsive to the branch prediction logic that directs speculative processing of instructions from both the first and second code sections prior to resolution of the condition if the resolution of the condition is determined to be unlikely to be predicted accurately.

22. The computer system as set forth in claim 21 wherein the branch prediction logic includes a buffer that indicates a predicted resolution of a condition for each of a plurality of branch instructions and an address of each branch instruction for which a predicted resolution is indicated, and wherein the branch prediction logic determines that resolution of the condition is unlikely to be predicted accurately if the address of the branch instruction is not indicated in the buffer at a time that the branch instruction is fetched.

23. The computer system as set forth in claim 21 wherein the branch prediction logic further indicates whether resolution of the condition was mispredicted a last time the branch instruction was fetched, and wherein the branch prediction logic determines that resolution of the condition is unlikely to be predicted accurately when resolution of the condition was mispredicted the last time the branch instruction was fetched.

24. The computer system as set forth in claim 21 wherein the branch prediction logic further indicates a number of times the resolution of the condition has been mispredicted out of a number of times the branch instruction has been fetched, and wherein the branch prediction logic determines that resolution of the condition is unlikely to be predicted accurately if the resolution of the condition has been mispredicted a predetermined percentage of the number of times the branch instruction has been fetched.

25. The computer system as set forth in claim 21 wherein the branch instruction is in a program and the branch prediction logic determines whether the resolution of the condition is unlikely to be predicted accurately based on a context of the branch instruction in the program.

26. The computer system as set forth in claim 21 wherein the stream management logic tracks concurrent processing of a plurality of instruction streams up to a first predetermined maximum number of instruction streams, each instruction stream including a plurality of code sections.

27. The computer system as set forth in claim 26 wherein the stream management logic is further responsive to availability of processor resources, the stream management logic directing speculative processing of instructions from both the first and second code sections prior to resolution of the condition if a number of instruction streams being concurrently processed is one less than the first predetermined maximum number.

28. The computer system as set forth in claim 21 wherein the stream management logic indicates a priority for speculative processing of each of the first and second code sections, the priority of the first code section being higher than the priority of the second code section if the branch prediction logic predicts that the condition will be resolved to be met, the priority of the first code section being lower than the priority of the second code section if the branch prediction logic predicts that the condition will be resolved to be not met.

29. The computer system as set forth in claim 21 wherein the stream management logic aborts speculative processing of the second code section if the condition is resolved to be met, and aborts speculative processing of the first code section if the condition is resolved to be not met.

* * * * *